United States Patent [19]

Ballyns

[11] Patent Number: 5,055,826
[45] Date of Patent: Oct. 8, 1991

[54] PRESSURE SENSOR SYSTEM

[76] Inventor: Jan Ballyns, 1125 Meadowlane Crescent, Pickering, Ontario, Canada, L1X 1E5

[21] Appl. No.: 509,631

[22] Filed: Apr. 16, 1990

Related U.S. Application Data

[63] Continuation-in-part of Ser. No. 447,807, Dec. 8, 1989, Pat. No. 4,975,679, which is a continuation-in-part of Ser. No. 202,262, Jun. 6, 1988, Pat. No. 4,890,090.

[51] Int. Cl.$^5$ ............................................. B60C 23/00
[52] U.S. Cl. ................................... 340/442; 340/447; 340/626; 200/61.22; 200/61.25; 200/83 A; 116/34 R; 73/146.8; 73/146.5
[58] Field of Search ............... 340/442, 447, 590–593, 340/626, 665; 200/61.22, 61.25, 83 R, 83 N, 83 A, 81 R; 116/34 R, 34 A, 34 B; 73/146.3, 146.5, 146.8, 146.2

[56] References Cited

U.S. PATENT DOCUMENTS

| | | | |
|---|---|---|---|
| 4,211,901 | 7/1980 | Matsuda et al. | 200/83 B |
| 4,890,090 | 12/1989 | Ballyns | 340/442 |
| 4,975,679 | 12/1990 | Ballyns | 340/442 |

Primary Examiner—Donnie L. Crosland
Attorney, Agent, or Firm—Fetherstonhaugh & Co.

[57] ABSTRACT

A pressure sensor that responds to a predetermined rate of change of pressure in the fluid medium comprises a housing that encloses a pressure chamber which has a permeable wall and flexible diaphragm that separates the pressure chamber from the pressure sensitive system in which the sensor is used. The sensor may be used in a pneumatic tire and in such use the flexible diaphragm will be deflected to activate a transmitter when the pressure in the tire changes at a hazardous rate. The sensor will not activate the transmitter when the rate of change of pressure is less than a hazardous rate of change.

13 Claims, 15 Drawing Sheets

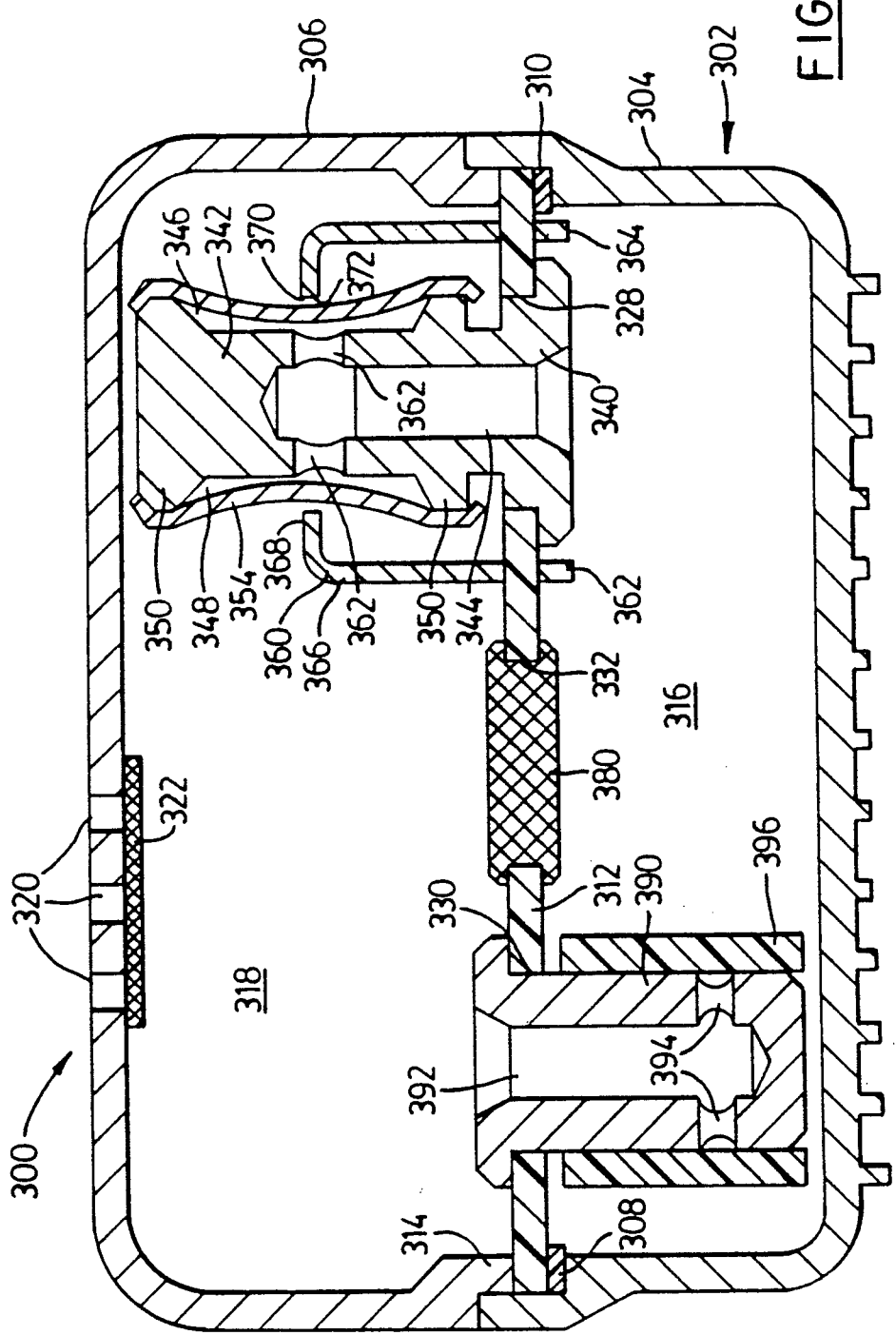

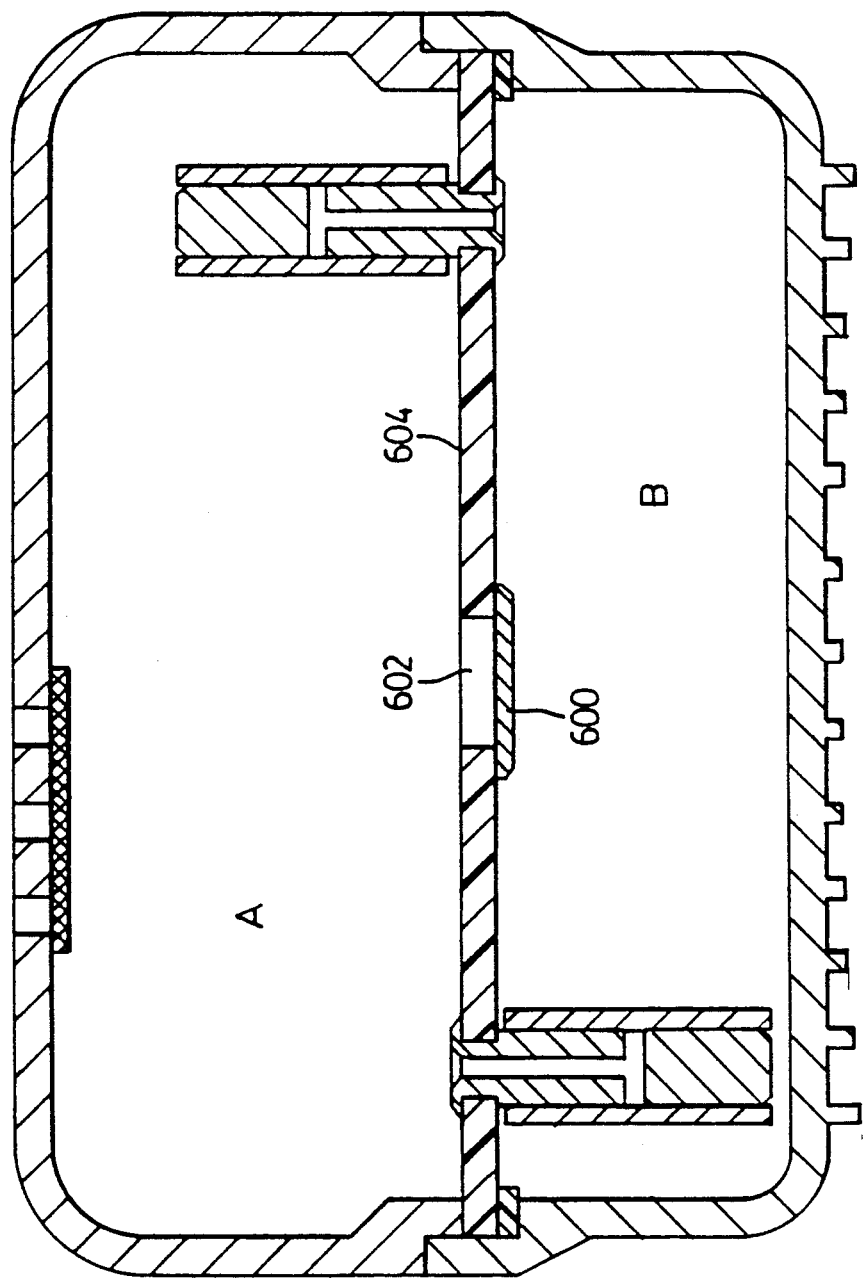

PRESSURE SENSOR SYSTEM

CROSS-REFERENCES TO RELATED APPLICATIONS

This application is a continuation in part of U.S. patent application Ser. No. 07/447,807 filed Dec. 8, 1989, now U.S. Pat. No. 4,975,679, which is in turn a continuation in part of U.S. patent application Ser. No. 07/202,262 filed June 6, 1988, now U.S. Pat. No. 4,890,090.

BACKGROUND OF THE INVENTION

This invention relates to a pressure sensor that responds to a predetermined rate of change of pressure in a fluid medium of a pressure sensitive system. In particular, this invention relates to a pressure sensor which may be used in a tire pressure warning system for generating an alarm signal when the rate of change of pressure in the tire exceeds a hazardous rate of change.

DESCRIPTION OF RELATED ART

Pressure sensitive switches that respond to pressure changes in order to generate an alarm are well-known. The present pressure sensor, however, responds to a predetermined rate of change of pressure in a fluid medium rather than a simple pressure differential.

U.S. Pat. No. 4,211,901 Matsuda is directed to a pressure sensing switch for transducing the change of pneumatic pressure to an electrical signal. This device responds to the pressure differential between two chambers that are separated by a diaphragm. The device is designed to respond to the pressure differential between the two chambers and makes no allowance for circumstances where the rate of change of pressure in the pressure sensitive system which is being monitored is such that it does not represent the hazard.

U.S. Pat. No. 4,048,614 Shumway discloses the pressure detector and radio transmitter system for providing a tire pressure warning. This system is designed to generate an alarm when the air pressure drops below a set minimum operating pressure.

While it is important under certain circumstances to generate an alarm when the pressure in the pneumatic tire drops below a predetermined critical pressure, there are circumstances under which the mere reduction in pressure in the tire below a predetermined level is not hazardous.

The wall of a pneumatic tire and the seal formed between the tire and the rim are permeable to a certain extent and as a result the pressure in an inflated tire will fall over an extended period of time. This very gradual reduction in pressure is not hazardous when, for example, the inflated tire is mounted on a trailer of a vehicle which is held in storage for a matter of several months. It is quite common to have trailers stored in a marshalling yard for extended periods of time and if the tires of these vehicles were fitted with tire pressure alarms that responded to a reduction in the pressure in the tire, these alarms would go off frequently. Because these alarms are likely to be powered by a low-powered battery, the batteries are likely to run down when the alarms go off and are unattended with the result that it would be necessary to replace the batteries before the device could be effectively reactivated. This involves removing the tire from the rim. In some circumstances the fact that the alarm has gone off and the battery has discharged may not be readily evident and this could give the operator a false sense of security in that the operator is not aware of the fact that the device is inoperable.

In most motor vehicles a slow loss in the pressure in a tire is not hazardous. As previously indicated, all tires are permeable to some extent with the result that air is escaping on a continuous basis from virtually all inflated pneumatic tires. This loss in pressure only becomes hazardous when the rate at which it occurs is such that the pressure in the tire can drop below a critical pressure during on-road use.

SUMMARY OF INVENTION

It is an object of the present invention to provide a pressure sensor that responds to a predetermined rate of change of pressure in a fluid medium of a pressure sensitive system.

It is a further object of the present invention to provide a pressure sensor in which a pressure chamber is formed and wherein one of the walls of the chamber is a permeable wall which serves to permit the pressure in the pressure chamber to change at a predetermined rate and wherein one of the walls of the pressure chamber is a flexible diaphragm that moves to a predetermined position in response to a predetermined change in the pressure differential between the pressure chamber and the pressure sensitive system with which the sensor communicates.

It is a further object of the present invention to provide a tire pressure alarm system that incorporates a pressure sensor that responds to a predetermined rate of change of the air pressure in the tire.

According to the present invention, there is provided a pressure sensor switch comprising a stem having a side wall surrounding a vent chamber that opens into one end of the stem, a vent passage opening from the vent chamber through the side wall of the stem, a tubular sleeve mounted on such stem and overlying said vent passage, said tubular sleeve being flexible so as to be movable to and fro between a first position in which it extends in close proximity to said vent passage and a second position which is spaced outwardly from the the first position with respect to the stem in response to a variation in pressure in the vent chamber, said sleeve being electrically conductive and forming a first terminal of said switch, a second terminal of said switch being located opposite said tubular sleeve so as to be spaced therefrom when the sleeve is in the said first position and to contact the sleeve when the sleeve is in said second position to open and close said switch in response to movement of said sleeve.

PREFERRED EMBODIMENT

The invention will be more clearly understood after reference to the following detailed specification read in conjunction with the drawings wherein;

FIG. 1 is a sectional side view of a pressure sensitive electrical switch constructed in accordance with an embodiment of the present invention, FIG. 2 is a diagram illustrating a pressure sensitive transmitter assembly incorporating the pressure sensitive switch of FIG. 1, FIG. 3 is a diagrammatic representation of a receiver for use in association with the transmitter of FIG. 1, FIG. 4 is a sectional view taken through an inflated wheel assembly illustrating the manner in which the transmitter and pressure sensitive switch are mounted within the inflation chamber of a tire, FIG. 5 is a pictorial view of the mounting bracket of FIG. 4, FIG. 6 is a partially sectioned pictorial view of a pressure sensitive transmitter assembly, FIG. 7 is a sectional side view through a portion of a pressure sensitive switch constructed in accordance with a further embodiment of the present invention, FIG. 8 is a sectional view taken through a membrane suitable for use in association with the switch constructed in accordance with FIG. 7.

FIG. 15 is a sectional side view of a pressure sensor constructed in accordance with a further embodiment of the present invention.

FIG. 21 is a sectional side view of a pressure sensor constructed in accordance with a still further embodiment of the present invention.

Figure 1:
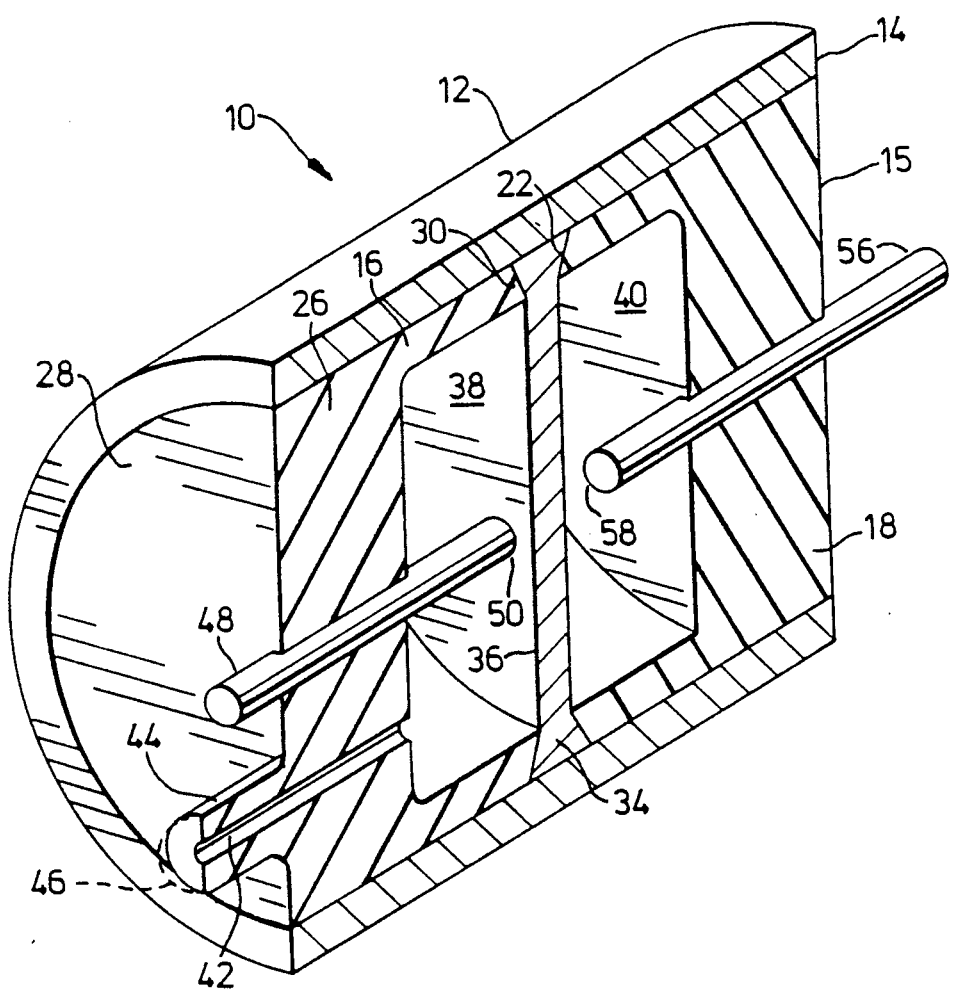

With reference to FIG. 1 of the drawings, the reference numeral 10 refers generally to a pressure sensitive electrical switch constructed in accordance with an embodiment of the present invention.

The pressure sensitive electrical switch 10 comprises a housing 12 which is constructed from three components which are identified by the reference numerals 14, 15 and 16. The component 14 is a cylindrical-shaped sleeve member which has a bore 20. The component 14 is made from a material which will act as a conductor such as brass or copper.

The component 16 is formed from an insulating material and has a cylindrical side wall 26 and an end wall 28. The cylindrical side wall 26 has an end face 30 which is outwardly and rearwardly inclined toward the end wall 28. The cylindrical side wall 26 is proportioned to fit in an interference fitting relationship within the bore 20 of the component 14. The component 15 is formed from an insulating material and has a cylindrical side wall 24 and an end wall 18. The side wall 24 has an end face 22 which is outwardly and rearwardly inclined toward the end wall 18. A flexible diaphragm 32 is formed with a perimeter mounting ring 34 and a thin flexible membrane 36. The mounting ring 34 is wedged between the end face 22 and the end face 30. It will be seen that the mounting ring 34 will be urged into contact with the inner face of the component 14 to form a good electrical contact therebetween.

The components 14, 15 and 16 and the flexible diaphragm 32 are assembled as shown in FIG. 1 such that the membrane 32 serves to separate the first pressure chamber 38 from the second pressure chamber 40. The second pressure chamber 40 is a sealed chamber. The first pressure chamber 38 has an access passage 42 which extends through a nipple 44 which is initially closed by a frangible end wall 46. The components 14, 15 and 16 and the diaphragm are assembled in an environment which is pressurized to the ambient or control pressure which is required in the second chamber 40 in use. When the device is to be used in a tire of a truck or the like the control pressure is about 100 psi.

A first electrical conductor 48 is mounted in the end wall 28 and projects into the first pressure chamber 38. The inner end 50 of the first electrical conductor 48 is arranged to spaced from the diaphragm 32 and serves to form a first electrical contact.

A second electrical conductor 56 is mounted in the end wall 18 and projects therethrough. The second electrical conductor 56 serves to provide a second contact 58 which is arranged in a spaced relationship with respect to the membrane 36 when it is in its normal position illustrated in FIG. 1. Preferably, the contacts 50 and 58 are equally spaced from the membrane 36. It will be apparent that when a pressure differential is established between the chambers 38 and 40, the flexible membrane 36 will be deflected toward the low pressure chamber and when a predetermined pressure differential is established, the membrane 36 will make contact with one or other of the contacts 50 or 58 to effectively close the switch to permit current to flow through the component 14, membrane 36 and either of the conductors 48 or 56 depending upon which of the conductors is in contact with the diaphragm 36.

The flexible diaphragm 32 is made from an electrically conductive silicone rubber material such as that manufactured by Armet Industries Corporation of Tilsonburg, Ontario, Canada. This material is normally considered to be substantially impermeable to air, however, a signficant amount of air may permeate the membrane 36 if a pressure differential is maintained between the chambers 38 and 40 for an extended period of time (i.e. several days). Because of the gradual equalization of pressure resulting from the permeability of the membrane 36 the membrane will not be deflected to contact the conductors unless the rate of charge of the pressure in the pressure chamber 40 exceeds the rate at which the fluid medium permeates the membrane 36.

By pressurizing the chambers 38 and 40 to an initial pressure which is close to the operating pressure in the system which is to be monitored, the membrane 36 will assume the neutral position. When the switch is to be used, the end wall 46 is removed from the nipple 44 to open the passageway 42. The passageway 42 is then placed in communication with the pressure system which is to be monitored so that the pressure in the system is applied to the first pressure chamber 38. If the pressure differential between the chambers 38 and 40 is greater than that within which the switch is designed to remain open, the flexible membrane 36 will be deflected into contact with one or other of the contacts 50 or 58 as previously indicated to close the switch 10.

When the pressure sensitive switch 10 is assembled in a pressurized environment, the chambers 38 and 40 are pressurized to a pressure which is substantially equal to the normal operating pressure. Any pressure differential which is initially present will gradually diminish as a result of the fact that the air will eventually permeate the membrane 36. The air pressure is maintained in the chambers 38 and 40 by reason of the end wall 46 which closes the passage 42.

Figure 2:
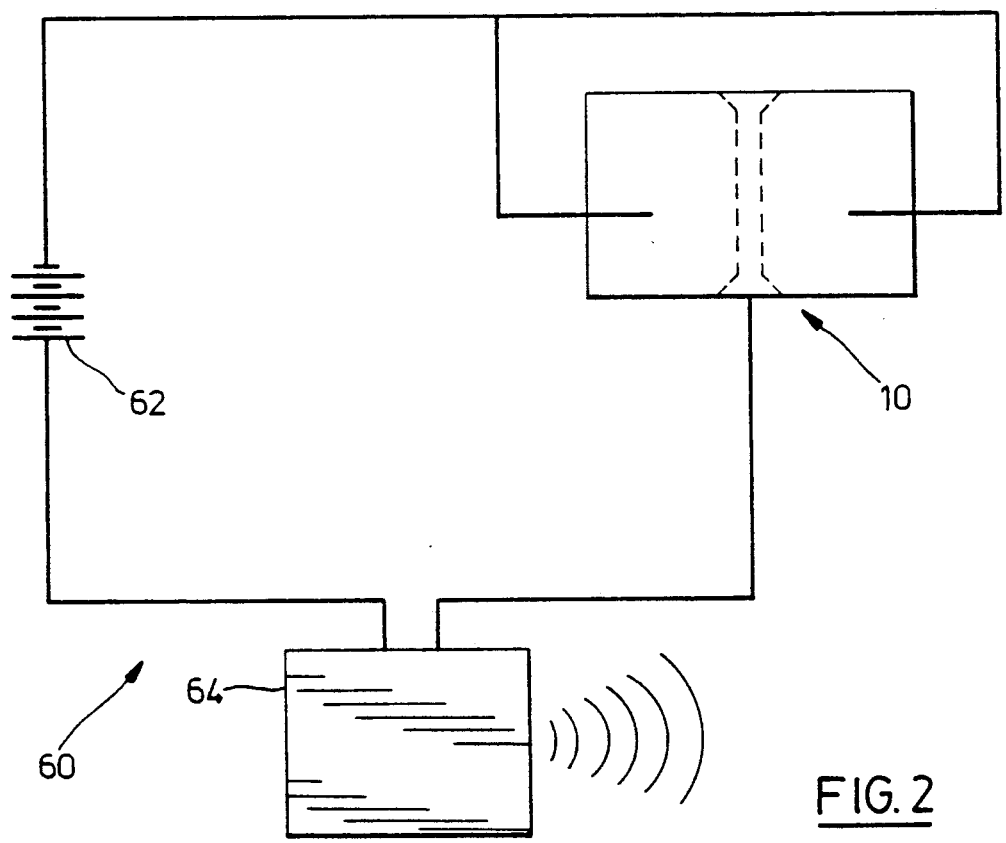

As shown in FIG. 2 of the drawings, the switch 10 may be used to advantage in a pressure sensitive transmitter assembly 60. The transmitter assembly 60 includes a power source in the form of an electrical battery 62 and a transmitter 64. A pressure sensitive transmitter assembly 60 of the type described in FIG. 2 of the drawings which is to be used in a tire pressure warning system may employ a battery such as one or more double-A 1.5 volt long-life batteries and a transmitter in the form of a commercially available short-wave radio transmitter such as the type commonly used to control the opening and closing of garage door mechanisms or the like.

Figure 3:
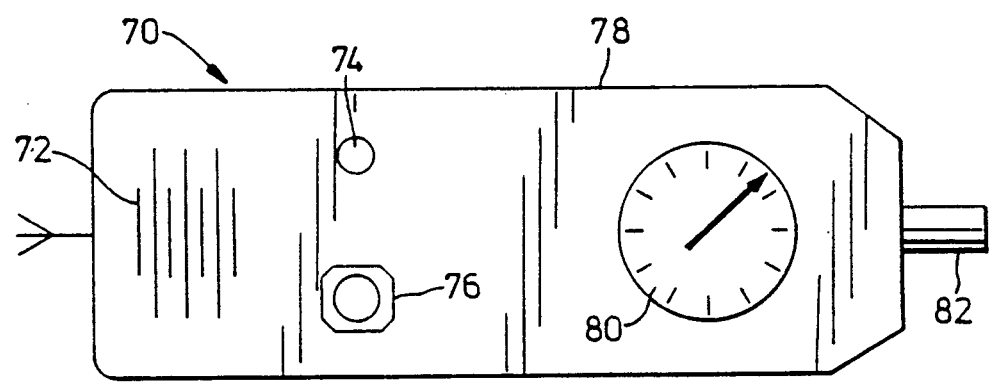

A portable receiver suitable for use in association with the transmitter assembly of FIG. 2 is generally identified by the reference numeral 70 in FIG. 3 of the drawings. The receiver 70 may be of any conventional construction compatible with the transmitter 42. The receiver 70 has an audible alarm 72 and a visual alarm 74. The audible alarm 72 may be in the form of an alarm buzzer and the visual alarm may be in the form of an LED. A cancellation button 76 is provided for interrupting the alarm circuit of the receiver. Receivers which generate audible alarms and activate visually detectable indicators in response to the receipt of a predetermined signal are well known and will not therefore be described in detail. The receiver of the present invention is mounted in a portable housing 78 in which a conventional pressure gage 80 may also be mounted. The pressure gage 80 has a connecting nipple 82 of a type suitable for forming a connection with the inflation valve of a tire or the like. The pressure gage 80 is designed to give a reading of the pressure detected when the connecting conduit 82 is coupled to a valve of a tire or the like.

Figure 4:
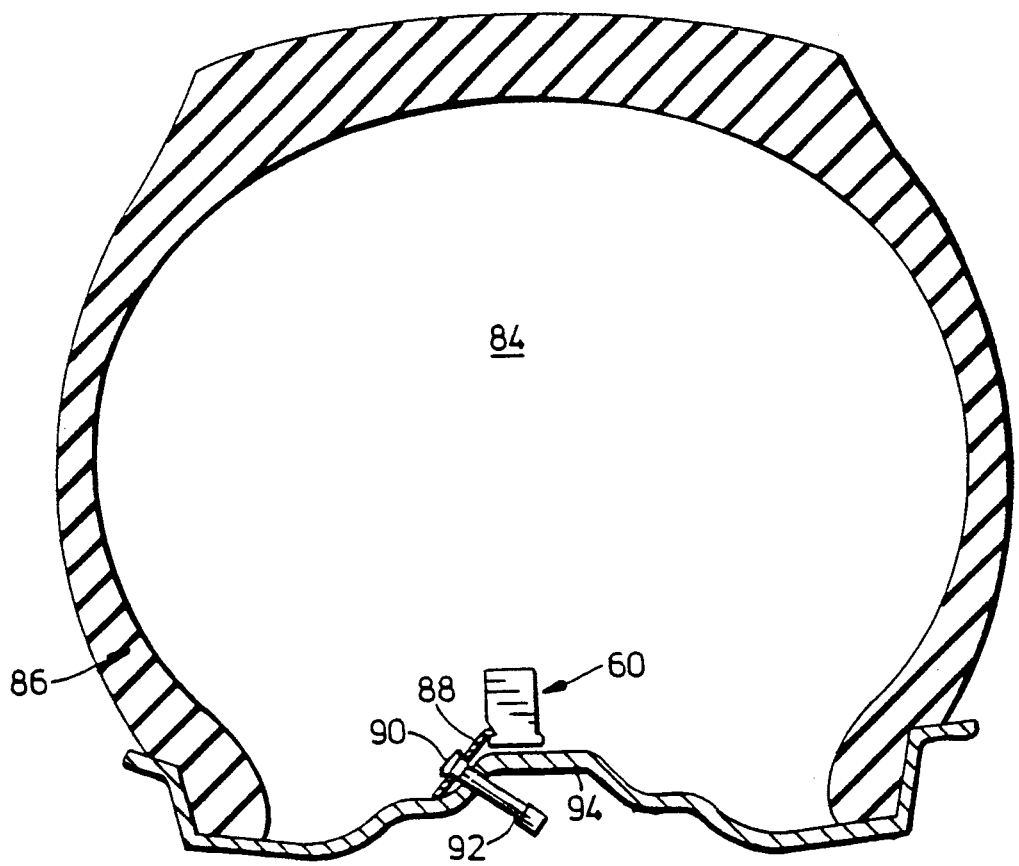

As shown in FIG. 4, the pressure sensitive transmitter assembly 60 is mounted within the inflation chamber 84 of a pneumatic tire assembly of the type generally identified by the reference numeral 86. In this embodiment the transmitter assembly 60 is mounted on a bracket 88 which is in turn mounted on the inner end 90 of the valve stem 92 which is mounted on the well rim 94.

Figure 5:
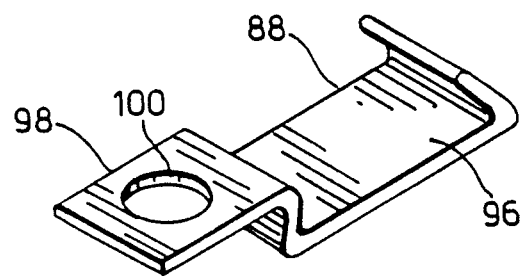

The mounting bracket 88 is illustrated in FIG. 5 of the drawings wherein it will be seen that it is shaped to provide a seat 96 and a mounting flange 98 in which a mounting passage 100 is formed. The mounting passage 100 is proportioned to receive the valve stem 92. The seat 96 has a generally dove-tail configuration.

Figure 6:
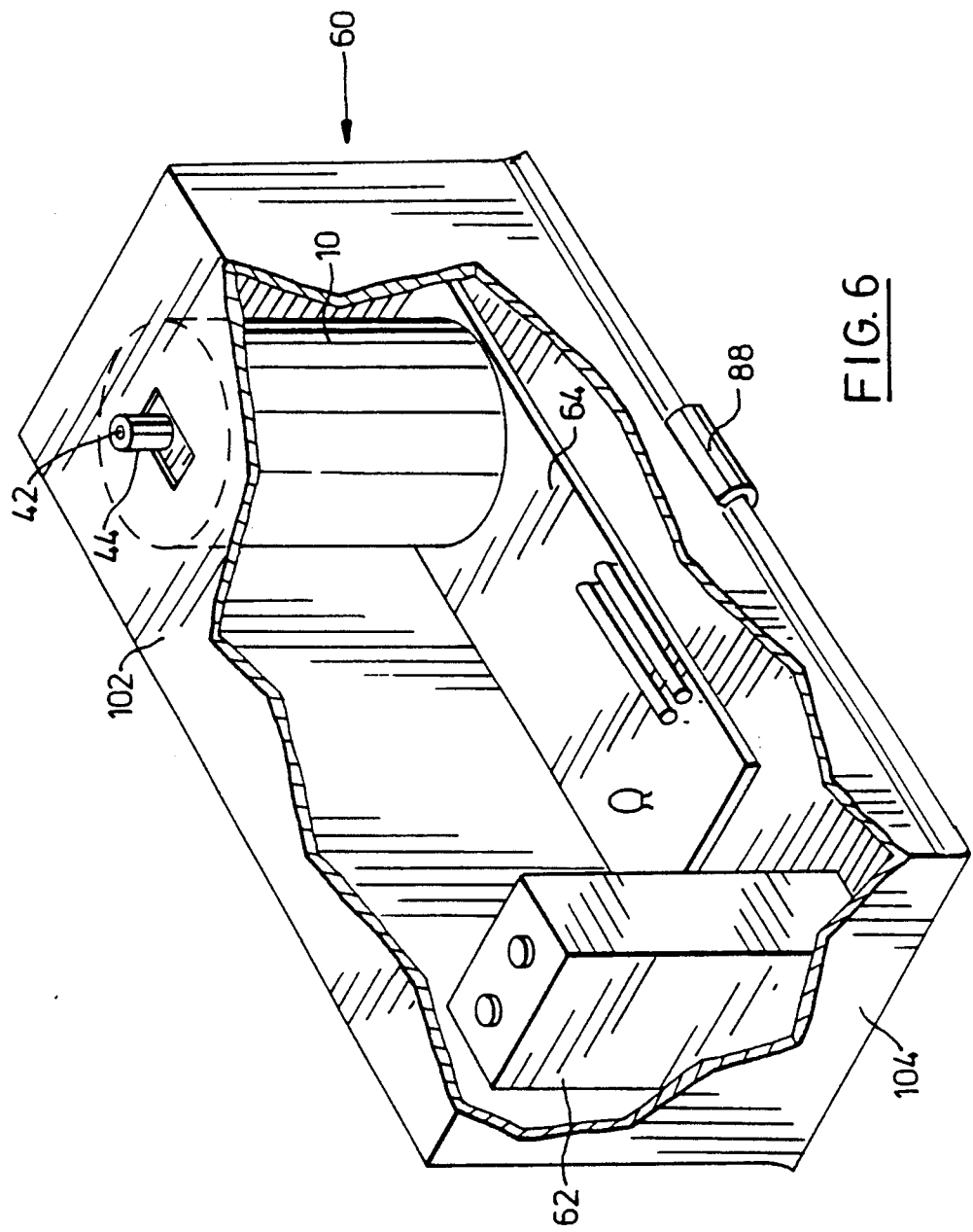

With reference to FIG. 6 of the drawings, it will be seen that the transmitter assembly 60 is mounted in a housing 102 which has a base portion 104 which has a dove-tail cross-sectional configuration corresponding to that of the seat 88. The battery 62, transmitter 64 and pressure-sensitive switch 10 are all accommodated within the housing 102 with the nipple 44 projecting through a wall of the housing 102 so that the through passage 42 will open into the inflation chamber 84 (FIG. 4) when the end wall 46 (FIG. 1) is removed.

Figure 7:
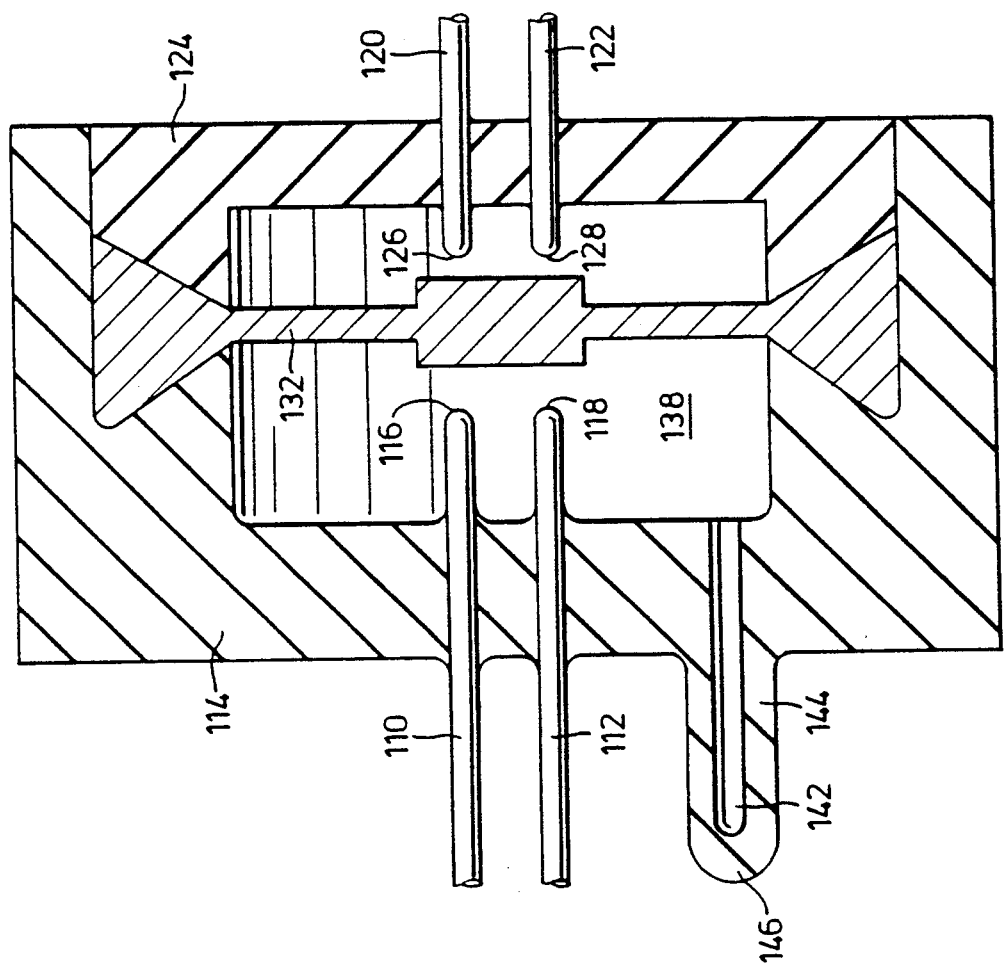

A pressure sensitive switch constructed in accordance with a further embodiment of the present invention is illustrated in FIG. 7 of the drawings to which reference is now made. In the embodiment illustrated in FIG. 7 of the drawing, conductors 110 and 112 are mounted in the end wall 114 in a spaced parallel relationship to provide contacts 116 and 118. Similarly, conductors 120 and 122 are mounted in the side wall 124 to provide terminals 126 and 128 on the opposite side of the diaphragm 132. An input passage 142 extends through a nipple 144 into the first chamber 138. The through passage 142 is normally closed by an end wall 146. In this embodiment, the diaphragm 132 is deflected into contact with the contacts 116, 118 or the contacts 126, 128 depending upon the direction in which the diaphragm is deflected. When the diaphragm makes contact with the contacts 116, 118, current can flow from the conductor 110 to the conductor 112. Similarly, when the diaphragm 132 makes contact with the contacts 126 and 128, current can flow through the conductor 120 to the conductor 122.

In a still further modification which is not shown, only one set of contacts 116, 118 may be provided on one side of a diaphragm so that movement of the diaphragm can make and break the contact between the contacts 116 and 118 as required in use.

Figure 8:
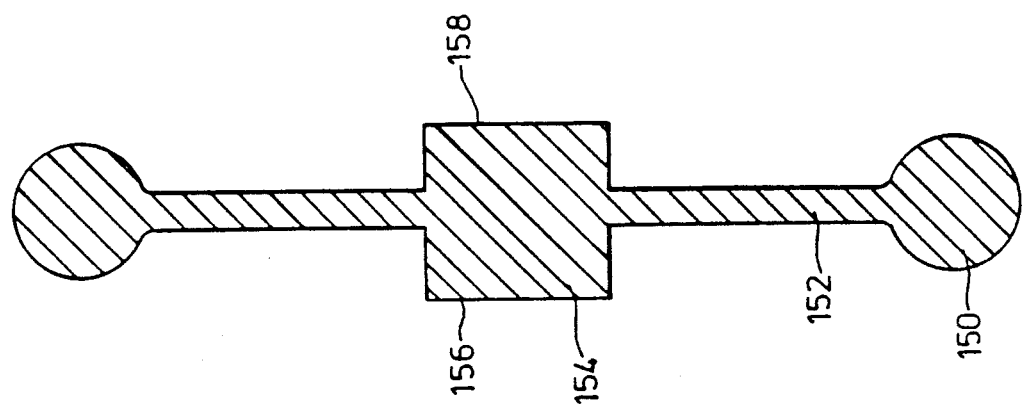

A diaphragm suitable for use in the embodiments illustrated in FIG. 7 of the drawings is shown in cross-section in FIG. 8. The diaphragm includes an annular perimeter ring 150, a flexible membrane 152 and a central boss 154. As previously indicated, the diaphragm is made from a flexible material which is capable of conducting electricity. When the annular ring 152 is clamped between the shoulder 24 and end face 30 (FIG. 1), it will be deformed to assume the generally triangular configuration illustrated in FIG. 1 and this will serve to lock the ring 150 in the housing.

The boss 154 is particularly suitable for use in the embodiments illustrated in FIG. 7 of the drawings wherein it is desirable to provide flat end faces 156 and 158 in order to establish contact between the contacts 116, 118 and between the contacts 126, 128 as previously described. The boss 154 and the membrane 152 are each circular in front view.

As previously indicated, when the pressure sensitive switch is initially assembled, the chambers 38 and 40 are pressurized to a pressure which is about equal to the pressure in the environment in which the pressure sensitive switch is designed to operate in use. In a typical installation such as the inflation chamber of a pneumatic tire such as that used in the trucking industry, the chambers 38 and 40 would be pressurized to about 100 psi gage. The pressure sensitive switch can be stored in this condition for an extended period of time because little or no load will be applied to the membrane because there is little or no pressure differential between the pressure chambers 38 and 40 and any pressure differential which may initially exist will diminish by reason of the permeability of the membrane 36. When the pressure sensitive switch is to be used in the manner illustrated in FIG. 4 of the drawings, the end wall 46 of the nipple is removed to open the passage 42. As a result, the pressure in the chamber 38 will drop and the membrane 36 will be deflected to make contact with the contact 50. This procedure can be used to test the transmitter to ensure that it will function to emit a warning signal. When the pressure sensitive switch is installed, the tire is then inflated and inflation will continue until the required pressure is established within the inflation chamber 84. This pressure will be transmitted to the pressure chamber 38 of the pressure sensitive switch and will serve to deflect the membrane 36 back to the neutral position. If the tire is over-inflated, the membrane 36 will be deflected to make contact with the contact 58 and this will again activate the transmitter to generate a warning signal. After the tire has been correctly inflated, the membrane 36 will be located in a position which is very close to the neutral position shown in FIG. 1 of the drawings. If there is a pressure differential between the pressure in the inflation chamber 84 and that in the reference chamber 40, the pressure differential will be reduced in time by reason of the permeability of the membrane 36. As previously indicated, even membranes which are considered to be substantially impermeable are not totally impermeable with the result that some transfer of air will take place over an extended period of time resulting in the elimination of pressure differentials which are maintained over a long period of time. If, however, the pressure in the inflation chamber 84 decreases or increases to an undesirable extent at a rate which is greater than the rate at which air can permeate the membrane 36, the membrane 36 will be deflected to form contact with the contact 50 or 58 to activate the transmitter which will in turn emit a warning signal which will activate the alarm mechanisms of the receiver as previously described.

Figure 9:
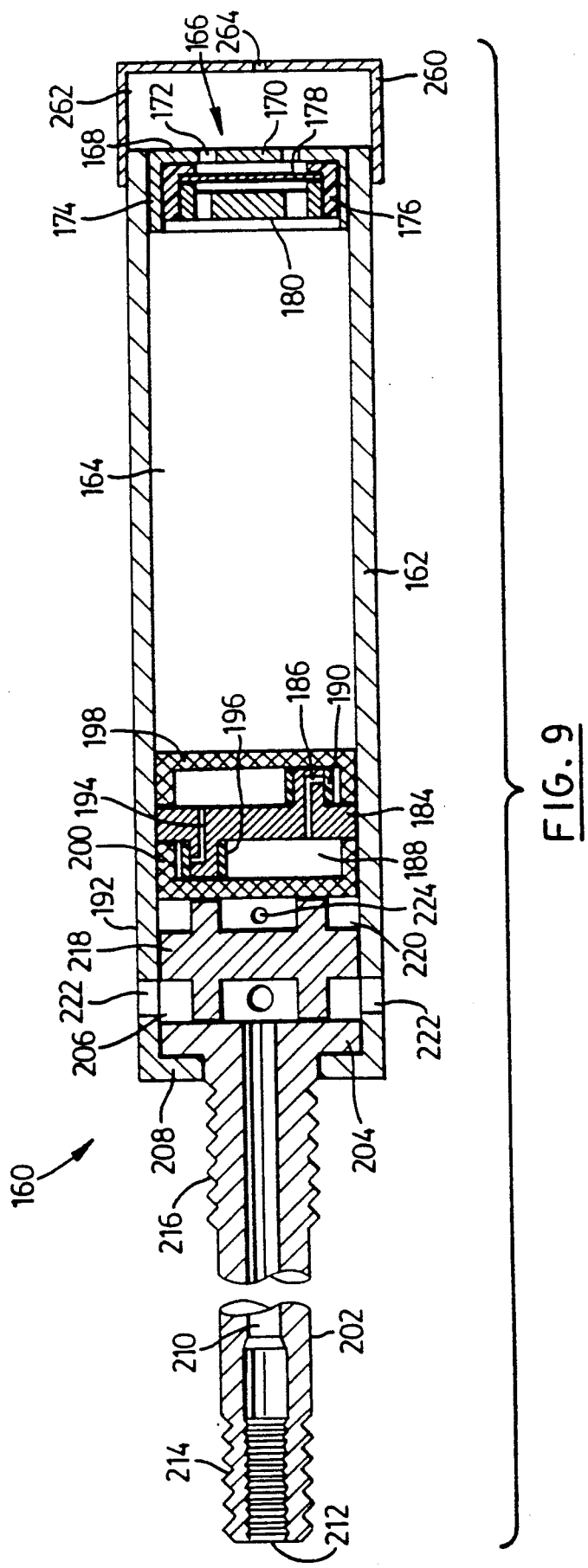
FIG. 9 is a sectional side view of a tire pressure arm system constructed in accordance with a further embodiment of the present invention.

A further embodiment to the present invention is illustrated in FIG. 9 on the drawings wherein reference number 160 refers generally to a pressure sensor and alarm system for use in a pneumatic tire.

The pressure sensor system 160 includes a housing 162 in which a pressure chamber 164 is formed. A pressure sensitive electrical switch which is generally indentified with reference number 166 is mounted at one end of the housing 162 and serves to form a wall of the pressure chamber 164. The switch 166 consists of an end cap 168 which is formed from an electrically conductive material and has an end wall 170 through which a plurality of passages 172 open to permit the fluid medium to pass to and fro between the chamber 262 and the chamber 173. The end cap 168 also has a tubular wall portion 174 which fits in a close fitting relationship within the end of the housing 162. An electrically insulating collar 176 is located inwardly from the tubular wall 174. A flexible diaphragm 178 is mounted within the switch 166 and is retained therein by means of a retaining wall 180. The retaining wall 180 has a plurality of passage ways 182 which open therethrough such that the fluid pressure within the pressure chamber 164 is applied to one side of the diaphragm 178. A transmitter and battery (not shown) may be located within the pressure chamber 164 with electrical connections being made between the battery, the terminals and the electrically conductive retaining wall 180 and the electrically conductive end cap 168. It will be seen that the collar 176 which is made from an insulating material serves to prevent direct electrical contact between the retaining wall 180 and the end cap 170. The diaphragm 178 is made from an electrical conductive material and is in contact with the retaining wall 180 when it is in its normal position shown in FIG. 9. It will be understood that when the pressure in the pressure chamber 164 exceeds the pressure in the inflation chamber by an amount such that a predetermined pressure differential exists between the pressure chamber 164 and the inflation chamber of the pneumatic tire in which the device is mounted in use, the diaphragm 178 will be deflected into contact with the end wall 170 of the end cap 168 to complete the electrical circuit and thereby activate the transmitter as previously described.

An end cap 260 is mounted on the housing 162 and serves to form an antechamber 262 which communicates with the diaphragm 178 through the passage 172. A small access passage 264 opens into the antechamber 262. The access passage 264 serves to ensure that the pressure in the antechamber 262 will not increase or decrease at a rate which is as great as the rate at which the pressure in the inflation chamber of the tire changes in response to movement of the wheel along a rough road surface or the like. The addition of the end cap serves to provide a "damper" which prevents the application of "spike" pressures to the diaphragm. It will be noted, however, that the passage 264 is sufficiently large to ensure that the pressure in the antechamber 262 will increase at a rate substantially in excess of that required in order to indicate the hazardous rate of change in the inflation chamber.

A second wall assembly of the pressure chamber 164 is generally identified by the reference numeral 184. This second wall has a first protuberance 186 which projects into the pressure chamber 164. A charging passage 188 extends through a second wall 184 and opens laterally outwardly through the site of the protuberance 186. A tubular sleeve 190 which is formed from a substantially impermeable elastic material extends over the protuberance 186 and serves to close the opening formed by the through passage 188. A similar protuberance 192 projects outwardly from the divider wall 184 and has a discharge passage 194 opening therethrough which is normally closed by a sleeve 196. A filter 198 extends over the inner face of the second wall 184 and serves to filter the fluid medium before it may be discharged from the pressure chamber through the discharge passage 194. A similar filter 200 extends over the outer face of the second wall 184 and serves to filter the fluid medium before it can pass through the charging passage 188.

A conventional air valve stem 202 has its inner end flange 204 seated in the chamber 206 so that it bears against the end wall 208. Through passage 210 extends through the stem 202 and has a threaded outer end portion 212 which serves to accommodate a Schrader valve external threads 214 provided to receive the conventional end cap bearing threads 216 are provided to facilitate the mounting of the valve in a conventional manner. A spacer 218 separates the flange 204 of the valve stem from the filter 192 and serves to form a further chamber 220. It will be understood that the pressure chamber 164, chamber 206 and chamber 220 each have a circular cross-sectional configuration or any other desired cross-sectional configuration. In use the pressure sensor system 160 is mounted on the rim of a wheel with the valve stem 202 projecting outwardly therefrom and the housing 162 located within the inflation chamber of the tire. A conventional one way valve is located in the threaded outer end 212 and the tire may then be inflated in a conventional manner. Air will then pass through the through passage 210 to enter the chamber 206. The air entering the chamber 206 will be discharged through the passages 222 into the inflation chamber of the tire. As the pressure within the pressure chamber of the tire increases, air will enter the chamber 220 through the passage 224. This air will pass through the filter 200 to the charging passage 188. Eventually the pressure in the chamber 220 will be sufficient to extend the sleeve 190 to an extent sufficient to open the access passage 188 to the pressure chamber 164. Air will continue to pass through the charging passage 188 until the pressure differential between the chamber 220 and the pressure chamber 164 is such that the sleeve 190 contracts to close the access passage. It will be noted that the sleeve 190 will act to prevent the pressure in the pressure chamber 164 rising above the pressure in the chamber 220 during the initial inflation stage and will serve to maintain the pressure chamber 164 at a pressure which is slightly less than that of the inflation chamber. The pressure differential which is maintained by the sleeve 190 is greater than that required to cause the flexible diaphragm 178 to be deflected into contact with the retaining wall 180. As a result during the initial inflation stage, the diaphragm 178 will be deflected into contact with the retaining wall 180 and will be supported by the retaining wall 180. The retaining wall 180 serves to insure that the diaphragm 178 will not be damaged in circumstances where the pressure differential between the inflation chamber and the pressure chamber 164 is greater than that which might otherwise be considered to be a hazardous differential. It will be understood that during the initial inflation of a pneumatic tire, it is quite common to inflate the tire to a pressure which is substantially above the normal operating pressure in order to insure that the tire is properly seated on the wheel rim. After the tire has been inflated to the installation pressure, air may then be discharged through the air valve and as a result the pressure in the tire inflation chamber may drop well below the pressure in the pressure chamber 164. When this occurs, the air may then be vented from the pressure chamber 164 through the discharge passage 194 by deflecting the sleeve 196. This discharging will continue until the pressure in the inflation chamber drops below the normal operating pressure. As a result the pressure differential between the pressure chamber 164 and the tire inflation chamber is such that the pressure in the chamber 164 exceeds the pressure in the inflation chamber by an amount which greater than that required to deflect the diaphragm 178 into contact with the end wall 170 and these will activate the transmitter. The tire is then re-inflated to increase the pressure in the inflation chamber to the required operating pressure. As a result, the pressure in the inflation chamber will once again exceed that in the pressure chamber. While the pressure differential is reduced by the passage of air through the charging passage 188, the pressure in the pressure chamber will remain slightly below that of the inflation chamber and consequently, the transmitter will be deactivated. Thereafter the permeability of the diaphragm will permit a gradual elimination of the pressure differential and the diaphragm will return to the neutral position. As a result of this procedure, the presence of an operable alarm device is signalled by the fact that the alarm is activated when air is vented from the overinflated tire. The alarm is, however, deactivated when the tire is reinflated to the operating pressure and will only be reactivated when a hazardous pressure drop occurs in the inflation chamber.

If as a result of a fast leak, the pressure in the tire inflation chamber drops at the hazardous rate which exceeds the rate of permeability of the diaphragm 178. The diaphragm 178 will be deflected into contact with the end wall 172 to activate the transmitter as previously described which will in turn activate the alarm system. As a result, an alarm signal will be generated. If, on the other hand, the pressure in the air inflation chamber of the tire increases or decreases at a rate which is less than that which is indicative of a hazardous rate of change, the permeability of the diaphragm 178 will insure that the diaphragm 178 is not deflected into contact with the end wall 178, and as a result the transmitter will not be activated.

The pressure sensor system illustrated in FIG. 9 can be installed in any pneumatic tire regardless of the cold inflation pressure required in the tire. The cold inflation pressure usually ranges from 28 to 30 psi for automobiles and 80 to 100 psi for truck tires. The charging passage 188 and the discharge passage 194 and their associated sleeves 190 and 196 serve to allow the pressure in the pressure chamber to be automatically adjusted to match the pressure in the tire and as a result, the sensor device of the present invention could just as easily be used in a high pressure or low pressure system because the pressure differential across the diaphragm will never exceed that permitted by the sleeves 190 and 196 which act as valves that open and close the charging and discharging passages 188 and 194.

Figure 10:
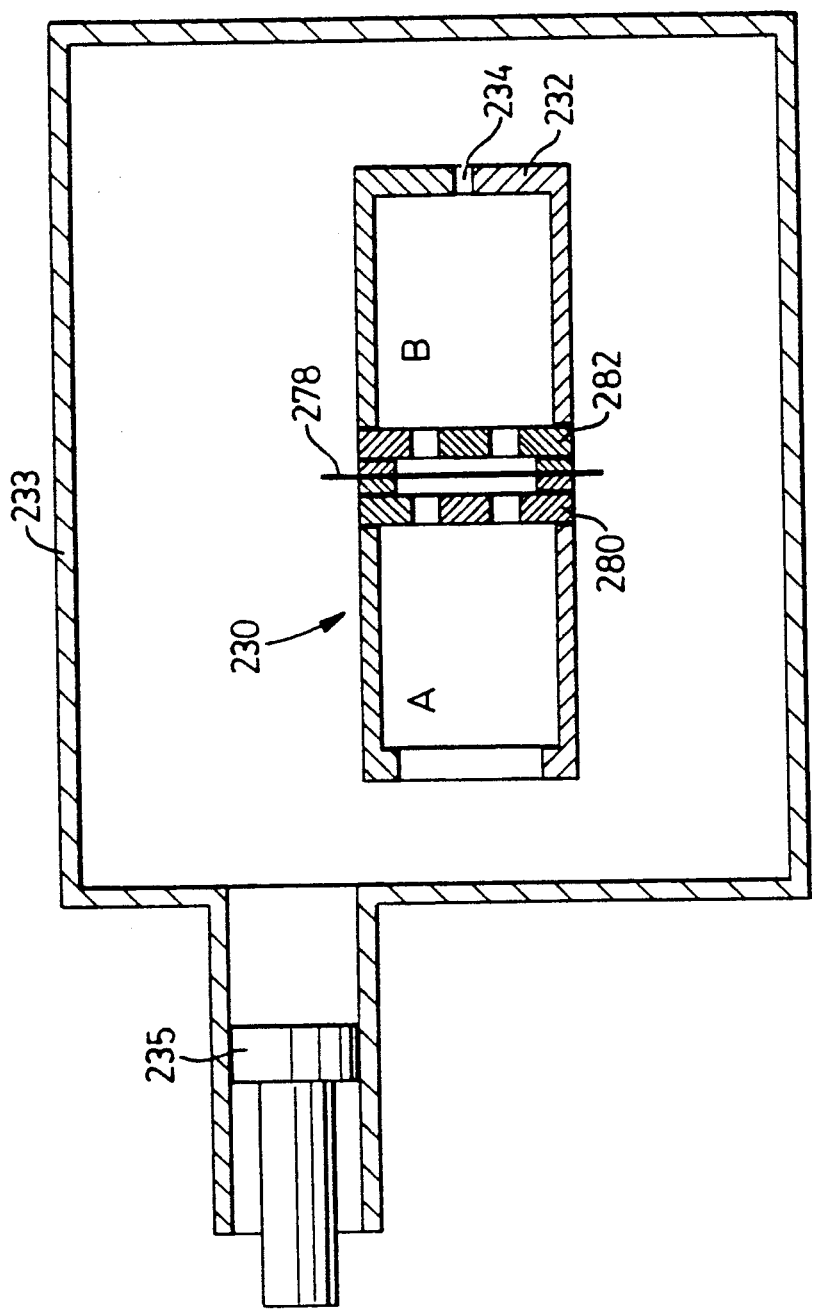
FIG. 10 is a diagrammatic representation of a pressure sensor constructed in accordance with a still further aspect of the present invention.

From the foregoing, it will be apparent that the pressure sensor system of the present invention is armed and ready to respond to a hazardous pressure change without the need to be electrically live. The system does not draw power from its electrical battery until the transmitter is activated as a result of the detection of a hazardous rate of pressure change in the tire. As a result, the operating life of the sensor system of the present invention may equal that of the tire in which it is installed in use. Obviously in circumstances where a defective tire is replaced or repaired, it is a simple matter to replace the sensor, and/or its battery. A further modification of the present invention as illustrated in FIG. 10 of the drawings wherein the rate of change sensor 230 as a pressure chamber B that is separated from the chamber A by means of a diaphragm 278. The end wall 232 is made permeable by providing a small orifice 234 which opens therethrough. In this device the diaphragm 278 is made from an electrical conductive material and the limit plates 280 and 282 are both electrically conductive and form terminals of a switch. When the pressure in the chamber B exceeds the pressure in the chamber A the diaphragm 278 may be deflected into contact with the wall 280 and when the pressure in the chamber A exceeds the pressure in the chamber B, the diaphragm may be deflected into contact with the wall 282.

The container 233 which is diagrammatically illustrated in FIG. 10 may be used for the purposes of calibrating the sensor switch of the present invention. When the capacity of the container 233 and the displacement of the plunger 234 are known, it is possible to change the pressure in the chamber A at a predetermined rate in order to determine the permeability of the permeable wall of the chamber B to insure that the diaphragm 278 will be displaced into contact with the wall 280 or the wall 282 when a hazardous rate of change in the pressure differential between the chambers A and B occurs.

Figure 11:
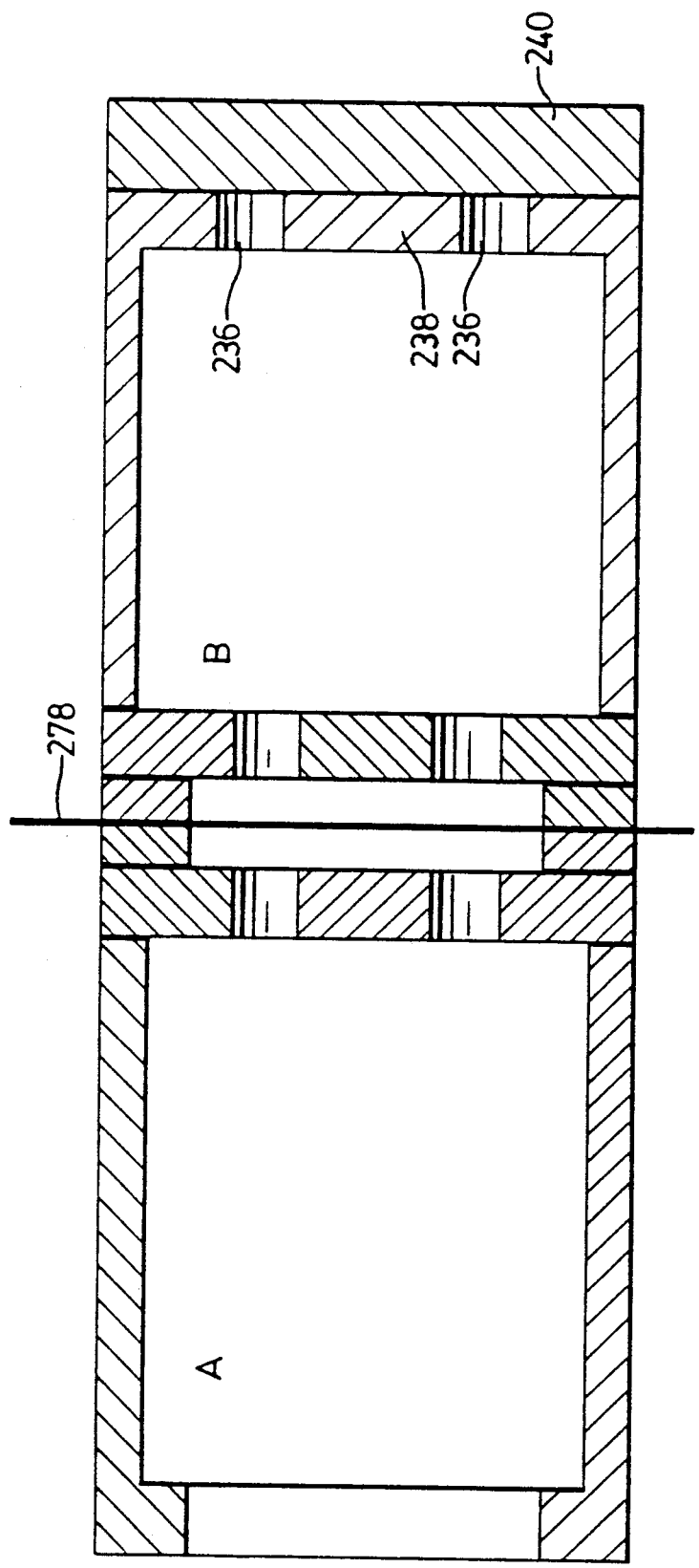
FIG. 11 is a diagrammatic representation of a pressure sensor illustrating a still further embodiment of the present invention.

A further embodiment of the present invention associated in FIG. 11 of the drawings wherein the permeable wall of the pressure chamber B is provided by forming passages 236 in an impermeable end wall 238 and apply a permeable cover plate 240 to the end wall 238. By reason of this structure, it is not necessary to make the diaphragm 278 from a permeable material.

Figure 12:
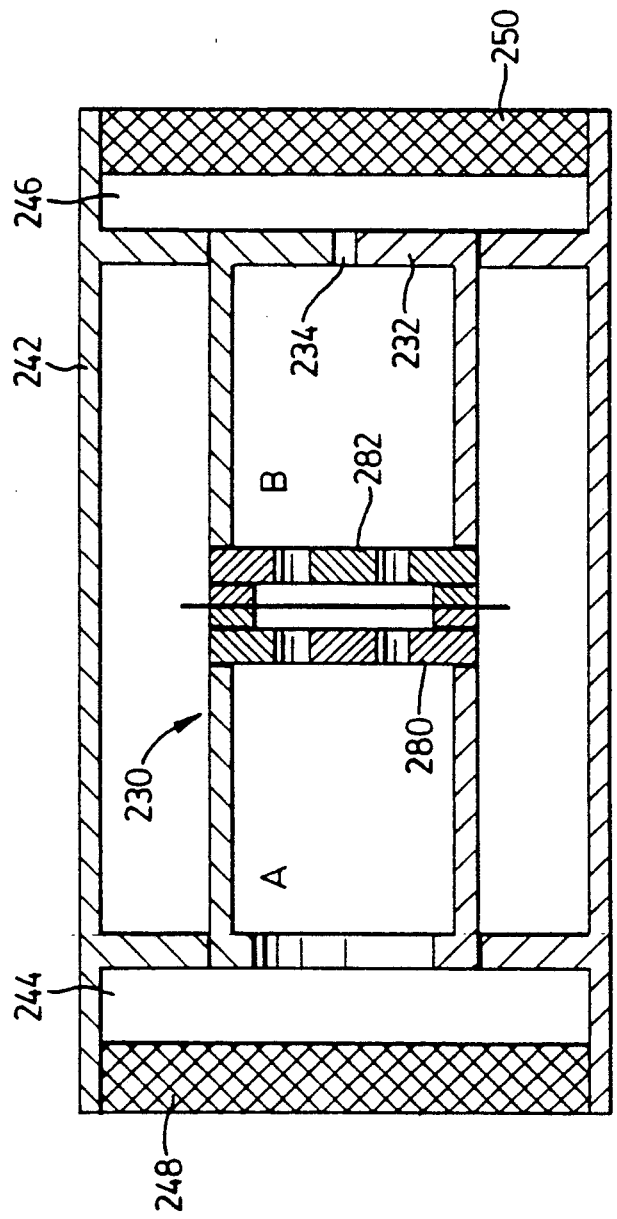
FIG. 12 is a diagrammatic representation of a pressure sensor illustrating a still further aspect of the present invention.

In a further embodiment illustrated in FIG. 12 the housing 230 is located in a filter housing 242 such that antechambers 244 and 246 are provided for the chambers A and B respectively. Filter elements 248 and 250 serve to filter the fluid medium before it can enter the chambers A and B respectively.

Figure 13:
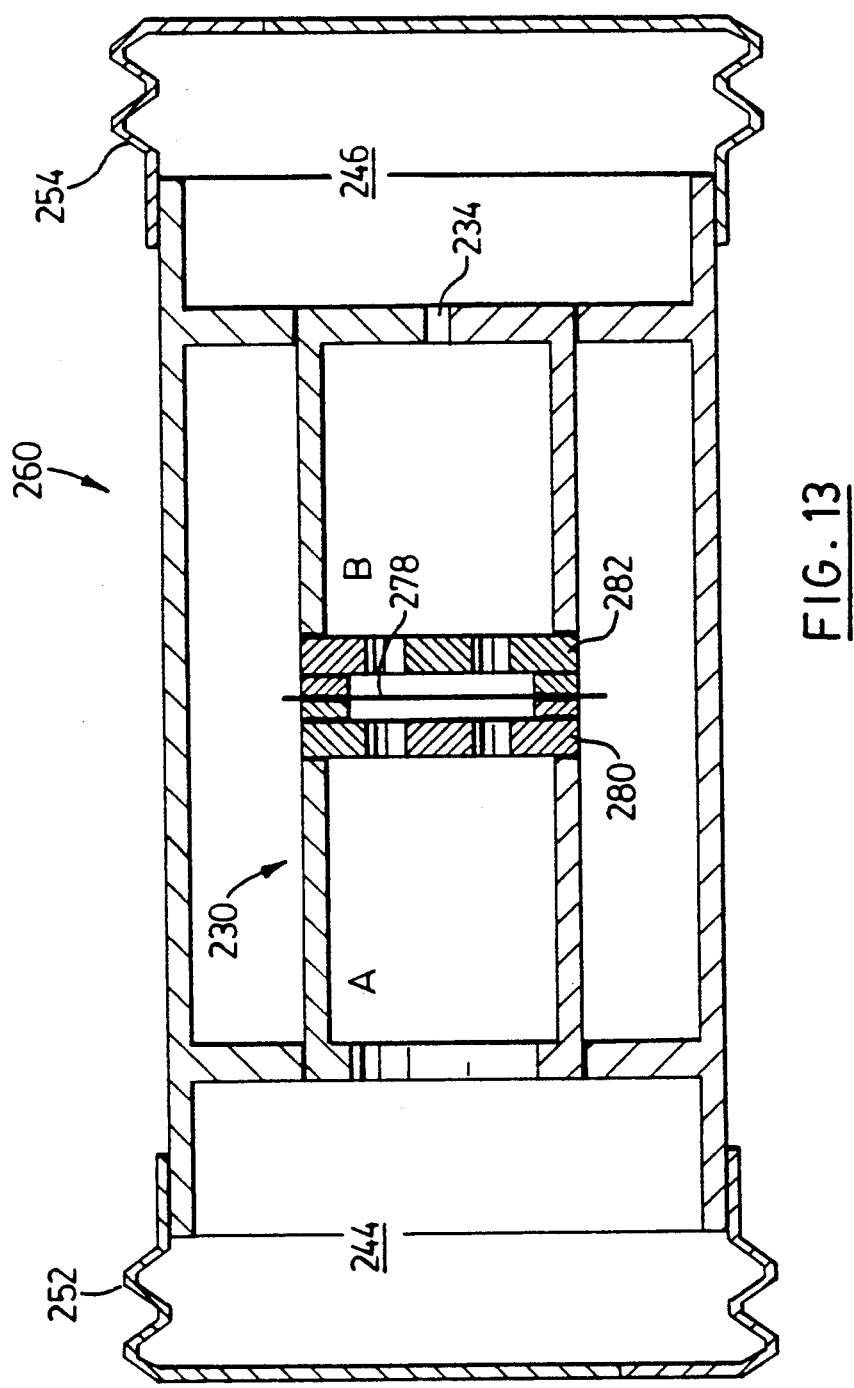
FIG. 13 is a diagrammatic representation of a pressure sensor illustrating yet another aspect of the present invention.

Yet another embodiment of the present invention is illustrated in FIG. 13 of the drawings wherein flexible bellows 252 and 254 enclose the antechamber 244 and 246 respectively. This structure is suitable for use in an environment where it is desirable to exclude the fluid medium in which the sensor is operating from the fluid medium in the pressure sensor system. It will be apparent that if the sensor system 260 of FIG. 13 is located in a pressure sensitive system in which the pressure drops the bellows 252 and 254 will both expand. If the rate at which the pressure drops is a hazardous rate, a pressure differential will be established between the chamber A and the chamber B because the passage 234 will not permit an equilibrium to be maintained between the chambers A and B; and as a result, the diaphragm 278 will be deflected into contact with the support valve 280 which will, in turn, activate the electrical system to generate an alarm. Similarly, if the pressure in the system in which the sensor 260 is located increases at a hazardous rate, the pressure in the chamber A will increase at a greater rate than the pressure in the chamber B; and as a result, the diaphragm 278 will be deflected into contact with the retainer wall 282 which will again complete the electrical circuit to activate an alarm.

Figure 14:
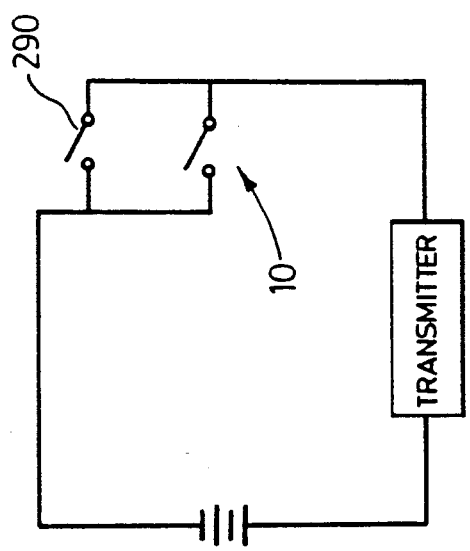
FIG. 14 is a circuit diagram illustrating a temperature switch arranged in series with the transmitter.

In the further modification illustrated in FIG. 14, a temperature sensitive switch 290 is provided in parallel with the switch 10. The switch 290 may be in the form of a normally open bimetallic switch which is temperature sensitive and will close to complete the circuit and generate an alarm when the temperature in the fluid medium in which it is located rises above a predetermined limit. As previously indicated, the sensor 10 compensates for temperature changes in the system and while this has distinct advantages, there are many applications in which it is desirable to generate an alarm when the temperature in the system exceeds a predetermined limit. For example, when a vehicle is operating with dual tires, one of the two tires of a set may be overloaded and may heat up until it explodes. The system illustrated in FIG. 14 will generate an alarm even if the pressure sensor is not activated by the change in pressure in the system.

As previously indicated, the pressure sensor of the present invention responds to the rate of change of pressure in the system which it monitors and is not affected by the actual pressure in the system. In addition, the pressure sensor is not affected by temperature changes in the system which it monitors because the sensor is housed within the system and temperature changes in the fluid which is being monitored will result in corresponding temperature changes in the sensor. This feature is particularly desirable when the sensor is used in a pneumatic tire where the temperature may vary substantially due to ambient temperature conditions or speed, load and road surface conditions. When the pressure sensor is mounted within the inflation chamber of a tire, pressure changes due to temperature changes will be substantially the same in the pressure chamber and in the inflation chamber and will not activate the alarm. In other systems where the tire pressure is compared to outside atmospheric pressure the changes in pressure resulting from temperature changes could cause the system to generate a false alarm. In these systems a drop in ambient temperature could also generate a false alarm.

Figure 16:
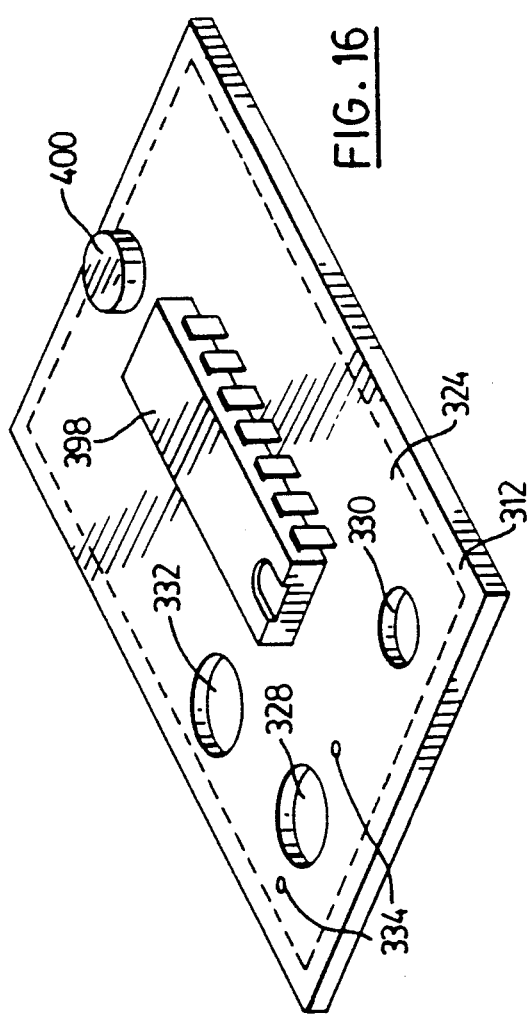
FIG. 16 is a pictorial view of the top surface of a divider wall suitable for use in a pressure sensor of the type illustrated in FIG. 15.
Figure 17:
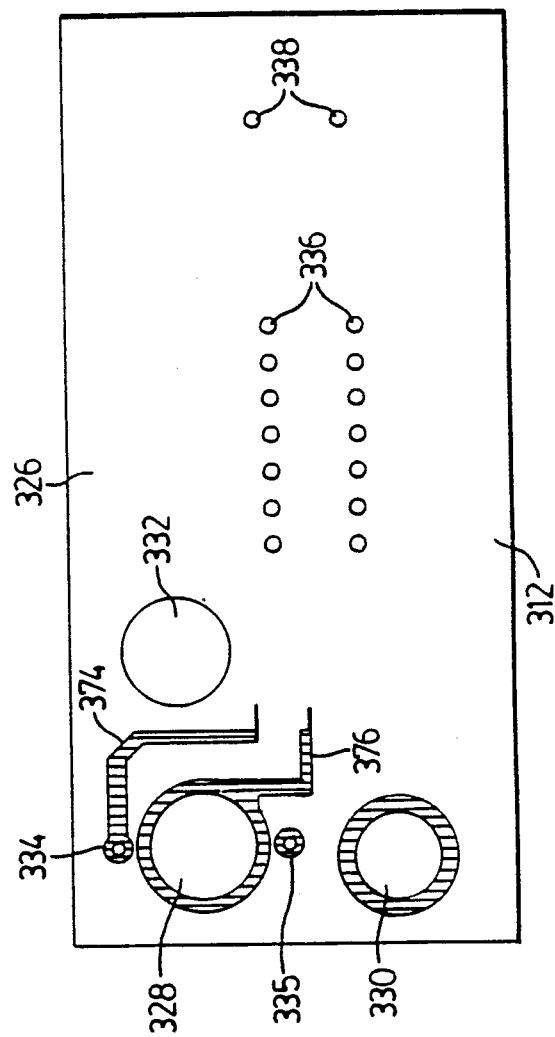
FIG. 17 is a plan view of the bottom face of the divider wall of FIG. 16.

A further embodiment of the present invention is illustrated in FIGS. 15, 16 and 17 of the drawings to which reference is now made. With reference to FIG. 15 of the drawings, reference numeral 300 refers generally to a pressure sensor constructed in accordance with the further embodiment of the present invention. The pressure sensor 300 consists of a housing which is generally identified by the reference numeral 302 and consists of a bottom cover 304 and a top cover 306. A ledge 308 is formed around the open end of the bottom cover 304. A gasket 310 is seated on the ledge 308 and a divider wall 312 rests on the gasket 310. The top cover 306 has a lip portion 314 arranged to bear against the divider wall 312 to clamp the divider wall against the gasket 308.

The divider wall 312 serves to divide the interior space of the assembled housing into a pressure chamber 316 and an input or charging chamber 318. The top cover 306 has a plurality of air input passages 320 opening therethrough and a filter 322 as arranged to overlie the passages 320 such that any air that enters the input chamber 318 is filtered.

As shown more clearly in FIGS. 16 and 17, the divider wall 312 is rectangular in shape as is the housing 302. The divider wall 312 has an upper face 324 and a lower face 326. Major passages 328, 330, and 332 open through the divider wall 312 as do minor passages 334, 335, 336, and 338.

As shown in FIG. 15 of the drawing, the stem 340 is mounted in the passage 328 and has a main body portion 342 which projects into the input chamber 318. A vent chamber 344 is formed in the stem 342 and opens into the pressure chamber 316. An annular recess 346 which is formed on the exterior of the circular stem 342 and serves to form an annular channel 348. Annular shoulders 350 are formed on stem 342 at opposite ends of the channel 348. Vent passages 352 open radially from the vent chamber 344 into the channel 348. A tubular sleeve 354 at its opposite ends supported by the shoulders 350 of the stem and the sleeve extends over the channel 348 and serves to close off the channel 348. The tubular sleeve 354 is made from a resiliently flexible electrically conductive material. The tubular sleeve 354 is proportioned so that the opposite ends thereof must be stretched in order to fit over the shoulders 350 with the result that in the relaxed configuration the main body of the sleeve will assume the concave curvature illustrates in FIG. 15. It will be noted, however, that if the pressure in the channel 348 is increased, the sleeve may be caused to balloon outwardly and ultimately the pressure in the channel 348 may be relieved by separation of the sleeve from one or both of the shoulders 350 to permit the fluid medium to be discharged from the channel 348 into the chamber 318.

Figure 18:
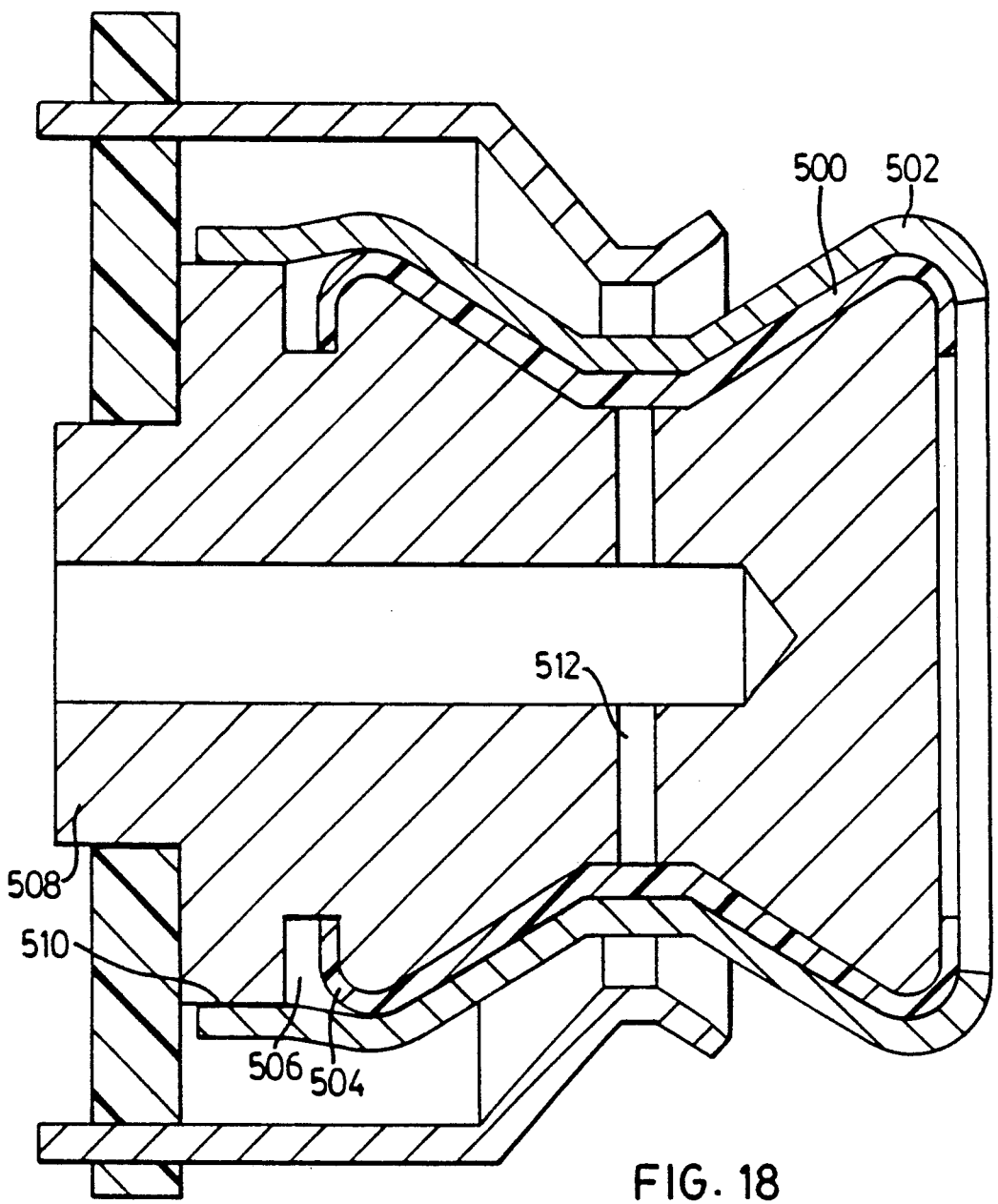
FIG. 18 is a sectional side view of a pressure relief valve constructed in accordance with a further embodiment of the present invention.

The stem 340 and tubular sleeve 354 are both electrical conductors. The sleeve 354 forms one terminal of an electrical switch. The other terminal of the electrical switch is formed by a conductive bridge member 360 which has legs 362 and 364 which extend through the passages 335 and 334 (FIG. 17) of the divider wall. The main body portion 366 of the conductive bridge is in the form of a cylindrical member which has an annular flange 368 which protects radially inwardly and has a passage 370 opening therethrough. The inner face 372 of the passager 370 forms the second terminal of a switch. The switch is closed when the conductive sleeve 354 is inflated to the extent that it will expand outwardly into contact with the face 342 of the conductive bridge. As shown in FIG. 18 of the drawings, the printed circuit has paths 374 and 376 that communicate with the conductive bridge 360 and the stem 340 respectively.

The conductive sleeve 354 is made from a permeable material of the type previously described with reference to the permeable diaphragm of the earlier embodiments such that the fluid medium that is contained in the pressure chamber 316 may pass through the tubular sleeve at a rate which will serve to permit equilization of the pressure on opposite sides of the diaphragm at a rate that would prevent detection of a change in pressure in the pressure sensitive system which occurs at a rate that is less than a hazardous rate. The permeable sleeve is sufficiently impermeable to prevent the passage of the fluid medium therethrough at a rate which will serve to prevent equalization of the pressure on opposite sides of the sleeve at a rate which would prevent movement of the sleeve from the retracted postition shown in FIG. 15 to the extended position when a hazardous rate of change occurs in the pressure sensitive system. From the foregoing it will be seen that the tubular sleeve of this embodiment performs the function of the flexible diaphragm and the first pressure relief valve of the embodiment illustrated in FIG. 9. In addition, it will be seen that the P.C. board 36 performs the function of the divider wall.

To supplement the permeability of the sleeve 354, a permeable plug 380 is mounted in the passage 332. This permeable plug 380 has the same permeability characteristics as those previously described with reference to the sleeve 354 and may be used either to supplement the permeability of the sleeve or in circumstances where the sleeve 354 is made from an impermeable material.

An input stem 390 is mounted in the passage 330 and has an input chamber 392 which opens into the input chamber 318. Passages 394 open radially outwardly from the chamber 392. A tubular sleeve 396 is mounted on the stem 390 and serves to normally close the passages 394 so that it will function as a charging device similar to that previously described with reference to FIG. 9.

As shown in FIG. 16 of the drawings, a chip 398 and a transmitter 400 are mounted on the circuit board and are connected to the printed circuit through the passages 336 and 338 respectively.

In use when a hazardous reduction in pressure occurs in the chamber 318, the pressure differential across the sleeve 354 will cause the sleeve 354 to balloon outwardly to contact the conductive bridge and this will complete the circuit of the printed circuit board which will in turn activate the transmitter 400 which will transmit a signal to the alarm device which will activate the alarm.

FIG. 18 of the drawings illustrates a modified stem and tubular sleeve construction. In the embodiment illustrated in FIG. 18, two tubular sleeves are employed. The inner tubular sleeve 500 is a highly flexible non-conductive sleeve and the outer sleeve 502 is a conductive sleeve. The proximal end 504 of the inner sleeve is seated in a groove 506 which is formed in the stem 508. The proximal end of the outer sleeve 502 rests on the shoulder 510 of the stem and makes electrical contact with the stem through the shoulder 510. By using this two part sleeve structure it is possible to use a relatively thin walled conductive sleeve which will have a substantial degree of flexibility while maintaining its electrical conductivity. By using a highly flexible non-conductive sleeve 500 it is possible to ensure that the passage 512 can be closed efficiently in use. This structure can be used in the embodiment illustrated in FIG. 15 when a permeable plug 380 is used.

Figures 19, 20:
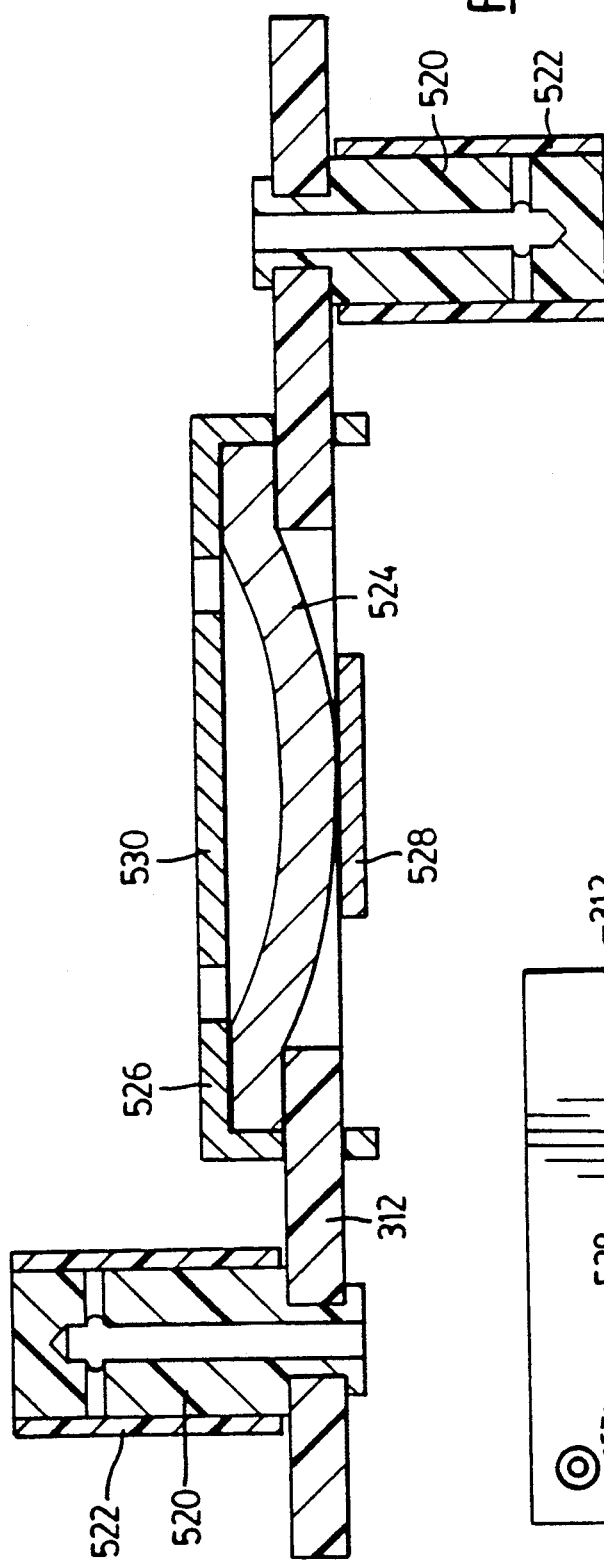
FIG. 19 is a sectional side view of a pressure sensor constructed in accordance with yet another embodiment of the present invention.
FIG. 20 is a plan view of the P.C. Board of FIG. 19.

An alternative structure is illustrated in FIGS. 19 and 20 of the drawings. As shown in FIG. 19, the stems 520 may be of identical construction and may be made from an extruded plastic material. The stems 520 do not have to be electrically conductive and similarly the flexible sleeves 522 are not made from electrically conductive material. As a result, the stem structure is inexpensive to manufacture and simple to install.

The diaphragm 524 is made from a conductive material and is secured to the P.C. Board by a conductive casing 526. A conductive bridge 528 is mounted on the underside of the P.C. Board 312 and extends in a spaced relationship with respect to the wall 530 of the casing 526. The conductive diaphragm 526 is sufficiently flexible to be deflected to the position shown in FIG. 19 when a predetermined pressure differential is established in order to complete the circuit of the P.C. Board and to activate an alarm as previously described.

A still further embodiment of the present invention is illustrated in FIG. 21 of the drawings. In this embodiment, a pressure transducer 600 is mounted in the passage 602 which opens through the P.C. Board 604. The pressure transducer is in the form of a transducer crystal which is made permeable by forming one or more passages that open therethrough. The passages may be formed by a laser so as to provide the degree of permeability previously described in the other embodiments of the invention which will ensure that the pressure transducer crystal responds to the rate of change of pressure in the pressure sensitive system in a like manner to that previously described. Alternativley, the P.C. Board may be made permeable by forming one or more passages opening therethrough by means of a laser in order to provide the required permeability.

Various further modifications of the present invention over and above those described herein will be apparent to those skilled in the art.

I claim:
1. A pressure sensor switch comprising:
 (a) a stem having a side wall surrounding a vent chamber that opens into one end of the stem, a vent passage opening from the vent chamber through the side wall of the stem,
 (b) a tubular sleeve mounted on said stem and overlying said vent passage, said tubular sleeve being flexible so as to be movable to and fro between a first position in which it extends in close proximity to said vent passage and a second position which is spaced outwardly from the first position with respect to the step in response to a variation in pressure in the vent chamber, said sleeve being electrically conductive and forming a first terminal of said switch,
 (c) a second terminal of said switch bieng located opposite said tubular sleeve so as to be spaced therefrom when the sleeve is in the said first position and to contact the sleeve when the sleeve is in said second position to open and close said switch in response to movement of said sleeve.

2. A pressure sensitive switch as claimed in claim 1 wherein the stem has an outer face in which an annular recess is formed between first and second ananular shoulders, said vent passage opening from said vent chamber into said annular recess, said tubular sleeve bridging and closing the annular recess and having opposite ends thereof mounted on said annular shoulders.

3. A pressure sensitive switch as claimed in claim 2 wherein said second terminal has a contact surface surrounding said sleeve.

4. A pressure sensitive switch as claimed in claim 3 wherein a portion of the second contact surface of the second terminal is located opposite said vent passage.

5. A pressure sensitive switch as claimed in claim 2 wherein at least one of said opposite ends of said sleeve is resiliently deformable to separate from the shoulder on which it is mounted to permit the fluid medium to discharge from the annular recess when the pressure in the pressure chamber exceeds a predetermined valve.

6. A pressure sensitive switch as claimed in claim 1 further comprising a housing having a divider wall therein that separates a pressure chamber from an input chamber, said stem being mounted on said divider wall such that said vent chamber communicates with said pressure chamber and said tubular sleeve is located in said input chamber and separates the vent passage from the input chamber.

7. A pressure sensitive switch as claimed in claim 6 wherein said divider wall is a printed circuit board which has a circuit printed thereon which is electrically connected to the first and second terminals.

8. A pressure sensitve switch as claimed in claim 7 wherein the stem is an electrical conductor that communicates between the circuit of the printed circuit board and the tubular sleeve.

9. A pressure sensitive switch as claimed in claim 1 wherein said tubular sleeve is fluid permeable member which is sufficiently permeable to permit the fluid medium to pass therethrough at a rate that will serve to permit equalization of the pressure in the pressure chamber and in the input chamber to prevent displacement of the tubular member from the first position to the second positon when the rate of change in the pressure and the input chamber is less than that which is indicative of a predetermined hazardous rate of change, the permeable member being sufficient impermeable to prevent the passage of fluid medium therethrough at a rate that will serve to prevent equalization of the pressure in the pressure chamber and the input chamber at a rate that would prevent movement of the sleeve from said first position to said second position when the predetermined rate of change occurs in the chamber.

10. A pressure sensitve switch as claimed in claim 6 wherein a pressure balancing passage is formed in the divider wall that communicates between the pressure chamber and the input chamber, and a fluid permeable member is mounted in said pressure balancing passage, said fluid permeable member being sufficiently permeable to permit the fluid medium to pass therethrough at a rate that will serve to permit equalization of the pressure in the pressure chamber and in the input chamber to prevent displacement of the tubular member from the first position to the second position when the rate of change in the pressure and the input chamnber is less than that which is indicative of a predetermined hazardous rate of change, the permeable member being sufficient impermeable to prevent the passage of fluid medium therethrough at a rate that will serve to prevent equalization of the pressure in the pressure chamber and the input chamber at a rate that would prevent movement of the sleeve from said first position to said second position when the predetermined rate of change occurs in the chamber.

11. A pressure sensitive switch as claimed in claim 10 wherein the fluid permeable member is in the form of a plug which is seated in said pressure balancing passage.

12. A pressure sensitive switch as claimed in claim 6 wherein the said housing comprises first and second segments which cooperate with one another to secure the divider wall therebetween.

13. A pressure sensitive switch as claimed in claim 6 wherein a second stem is mounted on said divider wall, said second stem having a side wall in which an input passage is formed which has a first portion of its length that opens inwardly from the input chamber and the second portion of its length which opens through the side wall into the pressure chamber and a second tubular sleeve mounted on said second stem and overlying and normally closing said second portion, said second tubular sleeve being flexible so as to be movable with respect to the second stem to permit the fluid medium to pass therethrough when the pressure in the input chamber is substantially greater than a predetermined operating pressure.

* * * * *

UNITED STATES PATENT AND TRADEMARK OFFICE
CERTIFICATE OF CORRECTION

PATENT NO. : 5,055,826
DATED : October 8, 1991
INVENTOR(S) : Jan Ballyns

It is certified that error appears in the above-identified patent and that said Letters Patent is hereby corrected as shown below:

Claim 1, column 14, line 61, cancel "step" and insert --stem--.

Claim 1, column 14, line 65, cancel "bieng" and insert --being--.

Claim 2, column 15, line 5, cancel "ananular" and insert --annular--.

Claim 9, column 15, line 40, cancel "is fluid" and insert --is a fluid--.

Claim 10, column 16, line 18, cancel "chamnber" and insert --chamber--.

Signed and Sealed this

Second Day of November, 1993

Attest:

BRUCE LEHMAN

Attesting Officer

Commissioner of Patents and Trademarks